United States Patent
Zaytsev et al.

(10) Patent No.: US 7,610,298 B2
(45) Date of Patent: Oct. 27, 2009

(54) DIFFERENCE-BASED DATABASE UPGRADE

(75) Inventors: Andrey A. Zaytsev, Sammamish, WA (US); Jigar B. Thakkar, Sammamish, WA (US); Sonja Jackson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 167 days.

(21) Appl. No.: 11/345,081

(22) Filed: Feb. 1, 2006

(65) Prior Publication Data
US 2007/0192290 A1    Aug. 16, 2007

(51) Int. Cl.
G06F 7/00     (2006.01)
G06F 12/00    (2006.01)
G06F 17/30    (2006.01)

(52) U.S. Cl. .................. 707/101; 707/102; 707/200
(58) Field of Classification Search .............. 707/10, 707/100, 101, 102, 201, 200
See application file for complete search history.

(56) References Cited

U.S. PATENT DOCUMENTS

| | | | | |
|---|---|---|---|---|
| 2003/0028555 A1* | 2/2003 | Young et al. | ................. | 707/204 |
| 2005/0015377 A1* | 1/2005 | Wan | ............................ | 707/10 |
| 2005/0071359 A1* | 3/2005 | Elandassery et al. | ........ | 707/102 |
| 2005/0149537 A1* | 7/2005 | Balin et al. | .................. | 707/100 |
| 2005/0149582 A1* | 7/2005 | Wissmann et al. | .......... | 707/201 |
| 2006/0085465 A1* | 4/2006 | Nori et al. | .................... | 707/101 |
| 2006/0136471 A1* | 6/2006 | Ge et al. | ...................... | 707/102 |
| 2006/0235899 A1* | 10/2006 | Tucker | ....................... | 707/200 |
| 2007/0245332 A1* | 10/2007 | Tal et al. | ..................... | 717/168 |
| 2008/0183776 A1* | 7/2008 | Kulkarni et al. | ............. | 707/204 |

OTHER PUBLICATIONS

Franconi et al, "A Semantic Approach for Schema Evolution and Versioning in Object-Oriented Databases", 2000, Springer-Verlag Berlin Kelberg.*
Breche et al, "Simulation of Schema Change using Views", Apr. 2006, Springer.*

* cited by examiner

*Primary Examiner*—Mohammad Ali
*Assistant Examiner*—Brannon W Smith
(74) *Attorney, Agent, or Firm*—Marshall, Gerstein & Borun LLP

(57) ABSTRACT

A method for updating a database that combines the advantages of both the migration and incremental approach may resolve some of the problems associated with earlier methods. This may be accomplished by a methodology which incrementally updates new data while using the migration approach to create an entirely new schema. Such a method might compare the metadata from both the existing database and the data update to generate a new schema and integrate new data into the database.

11 Claims, 5 Drawing Sheets

DIFFERENCE-BASED DATABASE UPGRADE

BACKGROUND

It is typically desirable that a database reflect the most current and accurate information available. To maintain effectiveness, databases often require periodic data and metadata updates. Currently, migration and incremental updates offer two methods for updating databases, however, both approaches exhibit limitations. Using the migration approach, a database manager must develop an entirely new schema as well as write new structured query language (SQL) migration scripts to move new data into the schema. If a database requires frequent updates, a database manager using the migration approach would be forced to design new schema and scripts for every revision. As an alternative, a manager could incrementally update the database by modifying the schema and data using SQL scripts alone. However, database schema are typically complex and often impractical to partially modify due to inherent data dependencies and other factors which can only be accurately duplicated by designing an entirely new schema. Due to these intricacies, databases updated using either the migration approach or incremental revisions will likely suffer inaccuracies over time.

SUMMARY

A method for updating a database that combines the advantages of both the migration and incremental approach may resolve some of the problems associated with earlier methods. This may be accomplished by a methodology which incrementally updates new data while using the migration approach to create an entirely new schema. Such a method might compare the metadata from both the existing database and the data update to generate a new schema and integrate new data into the database.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
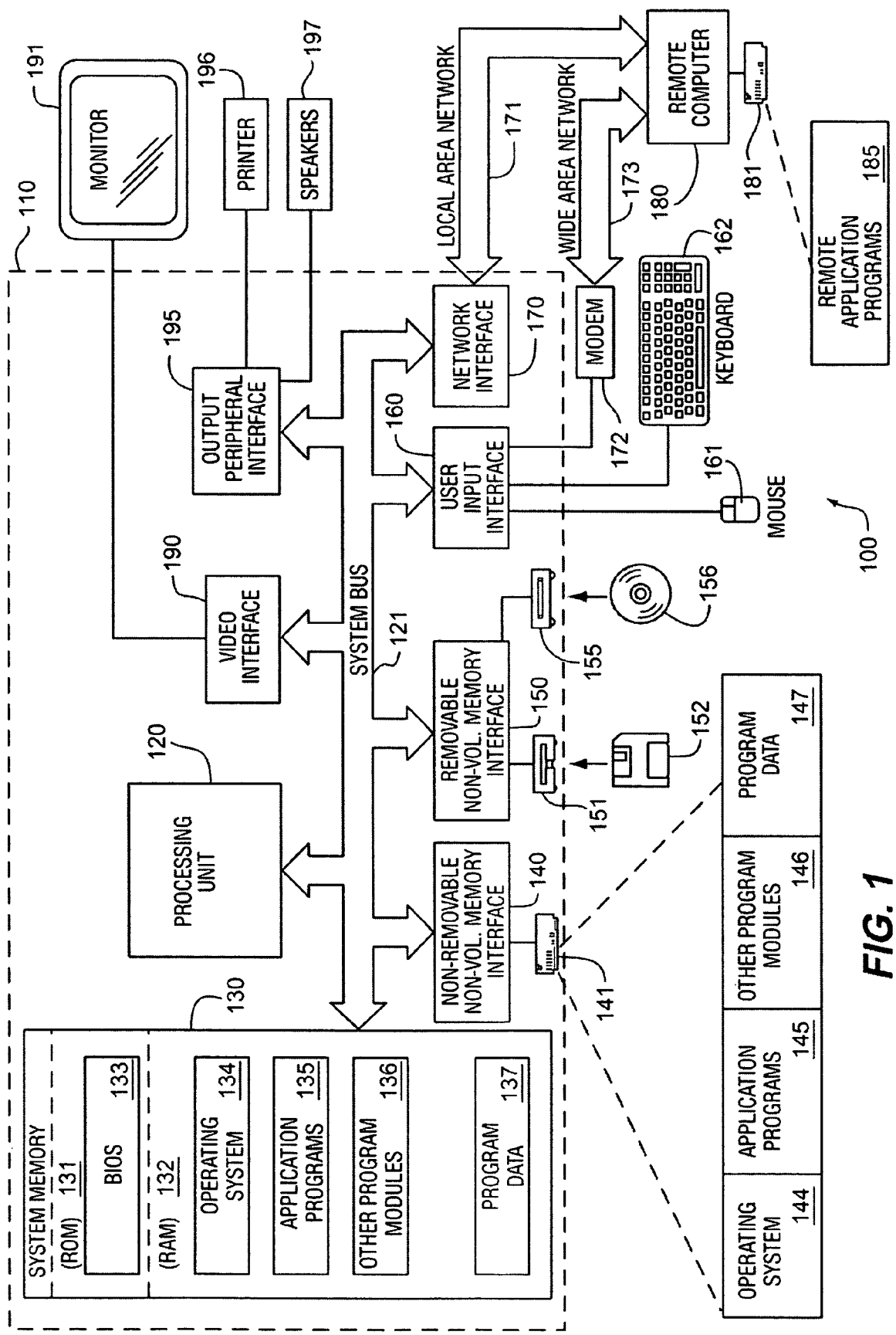
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation of the scope of use or functionality of the claimed method or apparatus. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc., that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer or PC 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190. Additionally, the printer 196 may be connected via the network interface 170.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
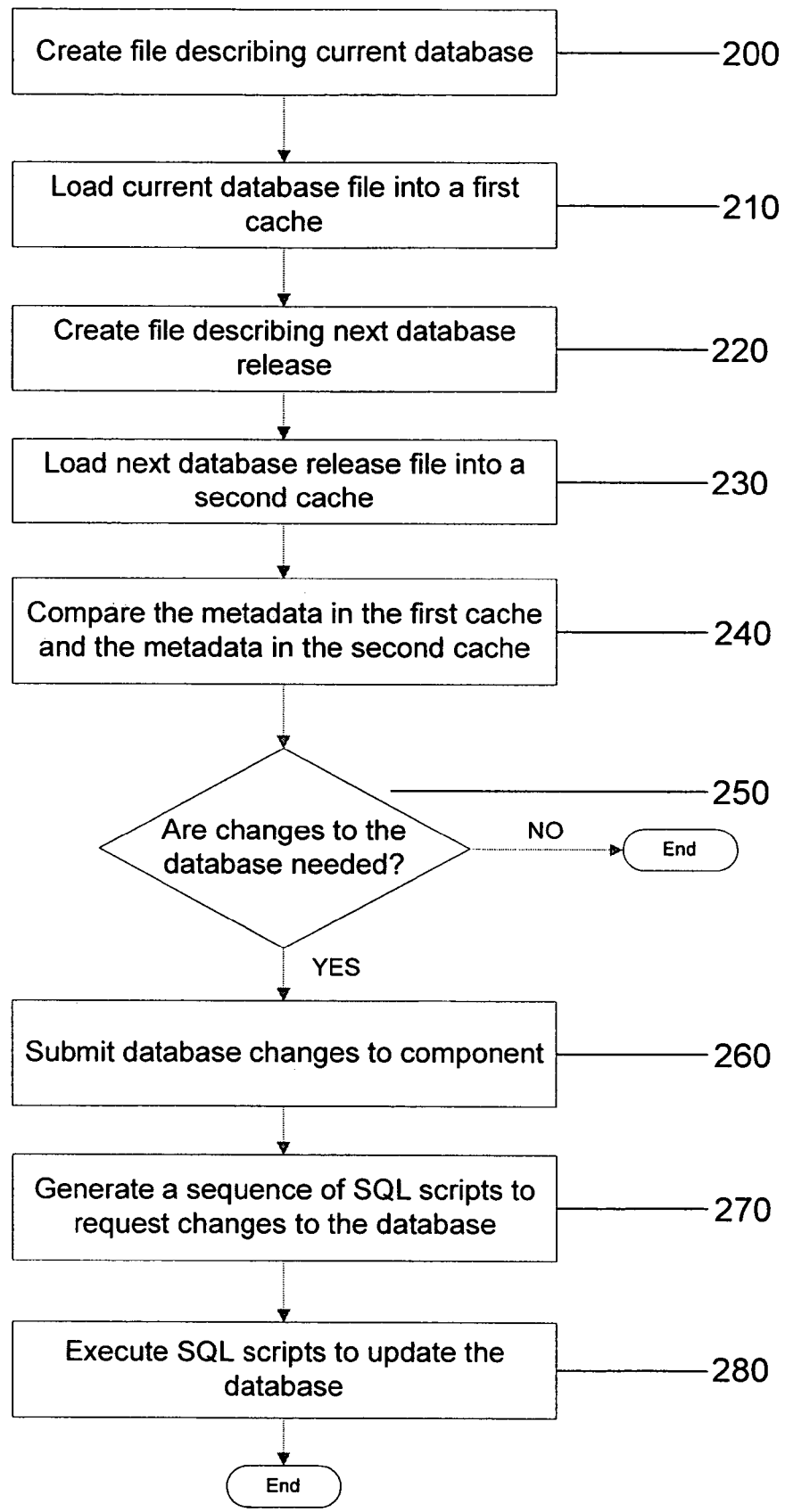
FIG. 2 is a flowchart explaining an embodiment of a control process for updating a database.
Figure 3:
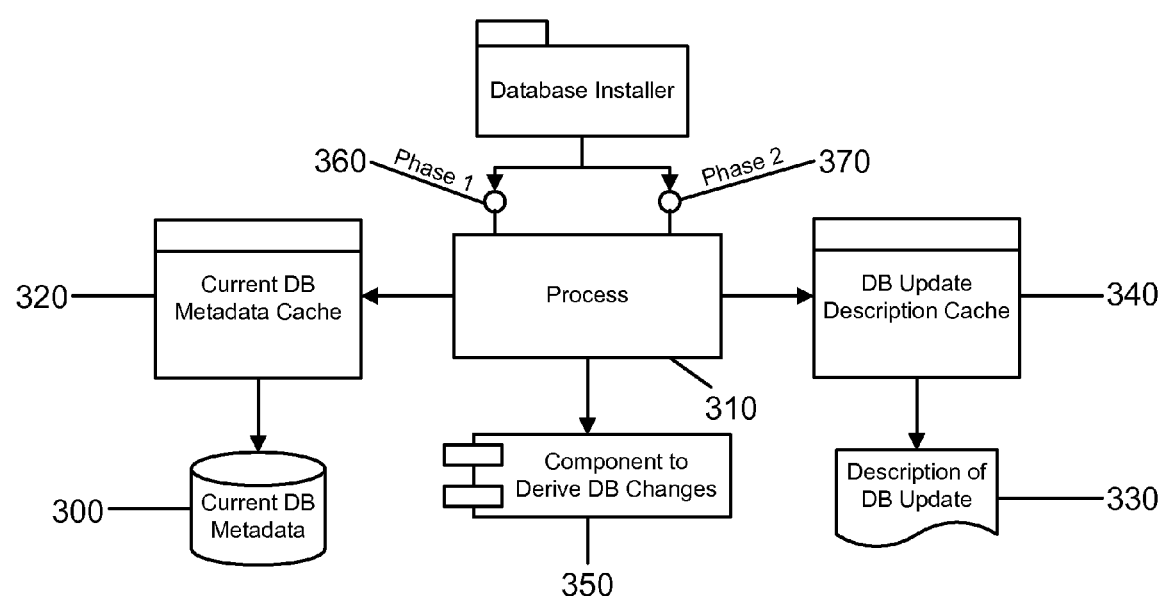
FIG. 3 is a diagram which describes the relationship between various components during a database update.

Generally, and with reference to FIGS. 2 and 3, a database may be updated by a process which combines the advantages of both the migration method and incremental updates. Specifically, the process begins at block 200 when a user or process may create a file describing the current database schema 300. The file 300 may represent the current database metadata. At block 210, a process 310 may load the file describing the current database 300 into a cache 320. At block 220, the user or a software process may create a file describing the next database release 330. The file 330 may be described in a common information format such as XML or the like and may be written manually or generated automatically. Like the file describing the current database 300, the file describing the next database release 330 may contain database metadata. At block 230, the process 310 may load the file describing the next database release 330 into a cache 340. Each cache 320 and 340 may now contain files which represent metadata corresponding to the current database 300 and a next release 330, respectively. The caches 320 and 340 may be used as a common denominator to compare the current database against the next release by abstracting the files 300 and 330 into objects which may be manipulated by various software processes. To ensure that each file may be compared against the other, the schema of both the current database and the database update may be separately serialized into files in a common information format such as XML, then further deserialized into objects stored in their respective caches 320 and 340. At block 230, the caches 320 and 340 may contain these comparable abstractions of the files 300 and 330, respectively.

At block 240, the process 310 may compare the caches 320 and 340 to determine differences between the next database release and the current database's entities, attributes, and relationships. At block 250, the process 310 may determine that changes to the database are needed. If changes to the database are needed, at block 260 the process 310 may submit the database changes as a series of requests to a component 350. Based on the changes needed, at block 270 the component 350 may then derive a script or sequence of changes to the database in a database query language such as SQL. At block 280, the process 310 may execute the sequence of changes in two phases, 360 and 370. During the first phase 360, the process 310 may add or update new entities and attributes to the database. During the second phase 370, the process 310 may delete the previous entities, attributes, relationships, and views, and add new database relationships and views based on the updated database. The database update may be complete after execution of the sequence of changes at block 280.

Figure 4:
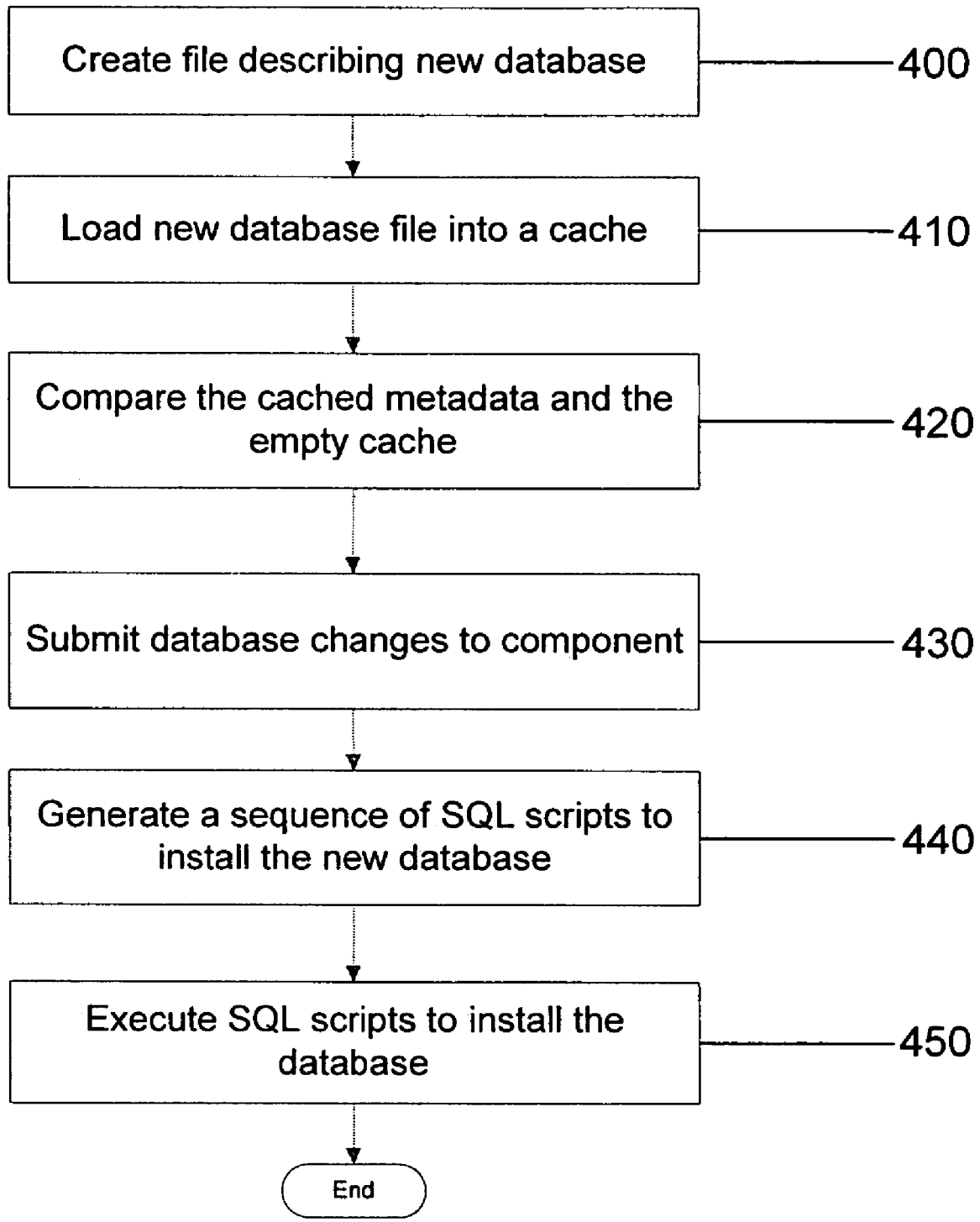
FIG. 4 is a flowchart explaining an embodiment of a control process for installing a new database.
Figure 5:
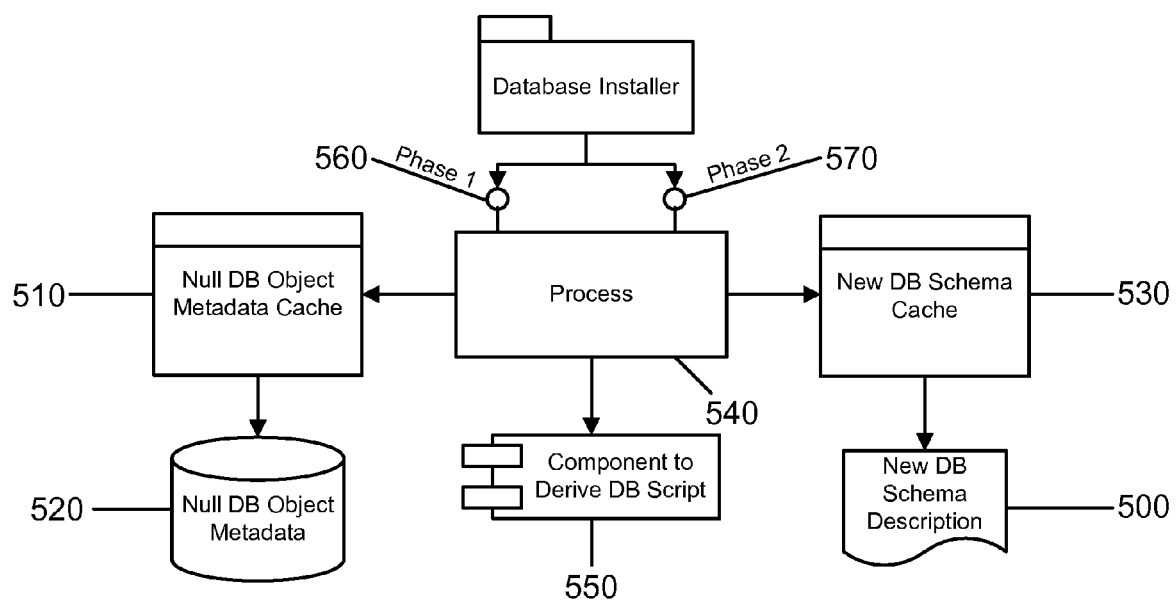
FIG. 5 is a diagram which describes the relationship between various components during a new database install.

Generally, and with reference to FIGS. 4 and 5, a new database may be created by a process similar to that described in relation to FIGS. 2 and 3. The process begins at block 400 when a user or process may create a file describing the new database schema 500. The file 500 may be described in a common information format such as XML or the like and may be written manually or generated automatically. Cache 510 may contain an empty or null database object 520. Both caches 510 and 530 may now contain files which may represent metadata corresponding to the new database 500 and an empty or null database object 520. The caches 510 and 530 may be used as a common denominator to compare the new database against an empty database by abstracting the files 520 and 500 into objects which may be manipulated by various software processes. To ensure that the files may be compared against each other, the null database 520 and the schema of the new database 500 may be separately serialized into files in a common information format such as XML, then further deserialized into objects stored in their respective caches 510 and 530. At block 410, the caches 510 and 530 may contain these comparable abstractions of the files 520 and 500, respectively.

At block 420, a process 540 may compare the caches 510 and 520 to determine differences between the new database entities, attributes, and relationships and the empty database 520. At block 430, a process 540 may submit the new database changes as a series of requests to a component 550. Based on the changes, at block 440 the component 550 may then derive a script or sequence of instructions to the database in a database query language such as SQL. At block 450, the process 540 may execute the sequence of changes in two phases, 560 and 570. During the first phase 560, the process 540 may add new entities and attributes to the empty or null database object 520. During the second phase 570, the process 540 may add new database relationships and views. The new database install may be complete after execution of the sequence of instructions at block 450.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A computing device comprising:
   a processor;
   a memory; and
   a database updating application maintained in the memory and executed on the processor to:
   serialize a first metadata to a common information format, wherein the first metadata describes a current database schema;
   serialize a second metadata to the common information format, wherein the second metadata describes an updated database schema;
   deserialize the first metadata in the common information format to a first comparable object;
   deserialize the second metadata in the common information format to a second comparable object;
   load the first comparable object into a first cache;
   load the second comparable object into a second cache;
   compare the first comparable object and the second comparable object to determine one or more differences between the current database schema and the updated database schema;
   generate one or more instructions for each of the differences between the current database schema and the updated database schema, each instruction to modify the current database to conform to the updated database schema; and
   derive a script from the one or more instructions, to be executed by the processor, the script including a first phase to be executed before a second phase, wherein the first phase instructions consist of: adding the updated database entity, updating the current database entity, adding the updated database attribute, and updating the current database attribute, the second phase instructions consist of: deleting the current database entity, deleting the current database attribute, deleting the current database relationship, deleting a current database view, adding the updated database relationship, and creating an updated database view, and the first comparable object and the second comparable object are in an identical file format.

2. The device of claim 1, wherein to load the first comparable object into the first cache comprises to serialize the first metadata from the database to the common information format and to deserialize the common information formatted metadata to an abstraction of the first metadata.

3. The device of claim 2, wherein to load the second comparable object into the second cache comprises to serialize the second metadata from the file to the common information format and to deserialize the common information formatted metadata to an abstraction of the second metadata that is able to be compared to the abstraction of the first metadata.

4. The device of claim 1, further comprising deriving the second metadata from the updated database schema.

5. The device of claim 1, wherein the first metadata consists of a current database entity, a current database attribute, and a current database relationship, and the second metadata consists of an updated database entity, an updated database attribute, and an updated database relationship.

6. A computing device comprising:
a processor;
a memory; and
a database updating application maintained in the memory and executed on the processor to:
serialize a first metadata file to a first XML file, the metadata describing the current database schema;
deserialize the first XML file to a first comparable object;
load the first comparable object into a first cache;
serialize a database update file to a second XML file, the database update file describing an updated version of the current database schema and consisting of a new entity, a new attribute, and a new relationship;
deserialize the second XML file to a second comparable object;
load the second comparable object into a second cache;
compare the first comparable object and the second comparable object to determine one or more differences between the current database schema and the updated database schema;
generate one or more instructions for each of the differences between the current database schema and the updated database schema, each instruction including a command to modify the current database to conform to the updated database schema; and
derive a script including the one or more instructions, to be executed by a processor, the script consisting of a first phase to be executed before a second phase;
wherein the first phase instructions consist of: adding the updated database entity, updating the current database entity, adding the updated database attribute, and updating the current database attribute, the second phase instructions consist of: deleting the current database entity, deleting the current database attribute, deleting the current database relationship, deleting a current database view, adding the updated database relationship, and creating an updated database view, and the first comparable object and the second comparable object are in an identical file format.

7. The device of claim 6, wherein the metadata comprises one or more of a current database entity, a current database attribute, and a current database relationship, and the database update file comprises one or more of the new entity, the new attribute, and the new relationship.

8. A computer storage medium storing computer executable instructions executed by a processor for updating a current database comprising computer executable instructions for:
loading a first metadata from the current database into a first cache, wherein the first metadata describes a current database schema;
loading a second metadata from a database next release file into a second cache, wherein the second metadata describes an updated database schema;
modifying one or more of the first metadata and the second metadata so that both the first metadata and the second metadata are in a common information format;
comparing the first common information formatted metadata and the second common information formatted metadata to determine one or more differences between the current database schema and the updated database schema;
generating one or more instructions for each of the differences between the current database schema and the updated database schema, each instruction including a command to modify the current database to conform to the updated database schema; and
deriving a script including the one or more instructions, to be executed by the processor, the script consisting of a first phase to be executed before a second phase, wherein the first phase instructions consist of: adding the updated database entity, updating the current database entity, adding the updated database attribute, and updating the current database attribute, the second phase instructions consist of: deleting the current database entity, deleting the current database attribute, deleting the current database relationship, deleting a current database view, adding the updated database relationship, and creating an updated database view, and the first common information formatted metadata and the second common information formatted metadata are in an identical file format.

9. The computer storage medium of claim 8, wherein loading the first metadata from the current database into a first cache comprises serializing the first metadata a common information format and desenalizing the common information formatted first metadata to an abstraction of the common information formatted first metadata.

10. The computer storage medium of claim 9, wherein loading the second metadata from the database next release file into the second cache comprises serializing the second metadata from the database next release file to a file format that is identical to the first common information formatted metadata and deserializing the common information formatted second metadata to an abstraction of the common information formatted second metadata that is able to be compared to the abstraction of the common information formatted first metadata.

11. The computer storage medium of claim 8, wherein the first common information formatted metadata comprises one or more of a current database entity, a current database attribute, and a current database relationship, and the second common information formatted metadata comprises one or more of an updated database entity, an updated database attribute, and an updated database relationship.

* * * * *